United States Patent
Ulanovsky

[15] 3,693,915
[45] Sept. 26, 1972

[54] INERTING SYSTEM FOR FUEL TANKS AND THE LIKE

[72] Inventor: Jack M. Ulanovsky, Newport Beach, Calif.

[73] Assignee: Parker-Hannifin Corporation, Cleveland, Ohio

[22] Filed: Jan. 28, 1971

[21] Appl. No.: 110,536

[52] U.S. Cl. .............................................. 244/135 R
[51] Int. Cl. ............................................... B64d 37/00
[58] Field of Search .................................. 244/135 R

[56] References Cited

UNITED STATES PATENTS

| | | |
|---|---|---|
| 3,229,446 | 1/1966 | Sebastian et al. ....... 244/135 R |
| 3,467,349 | 9/1969 | Gautier .................. 244/135 R |

Primary Examiner—Evon C. Blunk
Assistant Examiner—Douglas D. Watts
Attorney—Oberlin, Maky, Donnelly & Renner

[57] ABSTRACT

An inerting system which prevents fire and explosion within an aircraft fuel tank by maintaining the $O_2$ concentration in the vapor space thereof at less than 10 percent by volume which is below the flammable limit. This system is in addition to the known inerting system wherein an inert gas such as $N_2$ in the fuel tank vapor space dilutes and vents $O_2$ liberated from the fuel as during ascent of the aircraft and pressurizes the tank a during descent of the aircraft to prevent entry of air. The present inerting system contemplates scrubbing of the fuel in the tank during flight of the aircraft by circulating the fuel through a mixing nozzle having its suction port communicated with a source of supply of inert gas such as $N_2$ thus to liberate $O_2$ dissolved in the fuel for venting through the tank vent.

14 Claims, 2 Drawing Figures

PATENTED SEP 26 1972

3,693,915

INVENTOR.
JACK M. ULANOVSKY
BY
Oberlin, Maky, Donnelly & Renner
ATTORNEYS

INERTING SYSTEM FOR FUEL TANKS AND THE LIKE

BACKGROUND OF THE INVENTION

It is known that flame and explosion cannot propagate in a fuel tank regardless of any ignition source when the $O_2$ concentration in the fuel vapor is below the flammability limit. Heretofore, it has been contemplated to employ an inert gas such as $N_2$ to flush air which contains 21% $O_2$ out of the tank and then to pressurize the tank with $N_2$ to prevent entrance of air thereinto when ambient pressure increases relative to tank pressure, as during descent of the aircraft.

However, hydrocarbon fuels as employed in aircraft typically dissolve gases including $O_2$ from the air in proportion to the gas partial pressures at the air-fuel interface. Therefore, as tank pressure decreases during ascent, the fuel becomes supersaturated with the gases, that is, the fuel contains more gas than it can hold in equilibrium. When dissolved gases become supersaturated by reduction of pressure on the fuel, the gases will eventually come out of solution and rise into the vapor space above the fuel; however, they do have a tendency to remain in solution for extended periods of time depending on the degree of supersaturation and the degree of agitation of the fuel. Thus, the release of gases from fuel during and after climb is dependent on such variables as the attained altitude, buffeting of the aircraft by air turbulence, degree of fullness of the tank which affects the extent of sloshing, etc. Therefore, the timing of release of the gas in any particular flight is not predictable. Furthermore, the concentrations of the gases evolved from fuel by reduction of pressure is dependent on the partial pressures of the various dissolved gases and their solubility coefficients in the fuel. These factors are such that when gases are evolved from hydrocarbon fuel that has been supersaturated with air, the $O_2$ concentration in the vapor space may exceed 30 percent, and therefore, merely preventing air from entering the fuel tank will not assure safety against fuel tank explosion. It is also necessary to deal with the gases dissolved in the fuel which will otherwise evolve therefrom as high $O_2$ concentration gases during and after ascent.

SUMMARY OF THE INVENTION

In the fuel tank inerting system constituting the present invention not only is an inert gas deployed in the vapor space of the fuel tank to prevent air from entering the tank, but additionally, dissolved $O_2$ is removed from the fuel during flight and especially during the climb phase as tank pressure decreases, whereby the $O_2$ concentration in the fuel tank vapor space may be maintained at a safe level of 10 percent or less $O_2$ concentration so as not to propagate flame or explosion.

Herein, dissolved $O_2$ is removed from the fuel during flight by circulating the fuel in the tank through a mixing nozzle which has its suction port communicated with an inert gas supply source, whereby intimate mixing of the inert gas and the fuel in the mixing nozzle effects scrubbing of the fuel to liberate $O_2$ therefrom.

The present invention also contemplates the provision of a control valve which in one operating position communicates the inert gas supply source with the suction port of the mixing nozzle and which in another operating position cuts off the supply of inert gas and communicates the suction port of the mixing nozzle with the fuel tank vapor space to maintain the suction port and inert gas flow restrictor free of fuel for instantaneous mixing action when the control valve is moved to said one operating position.

The inerting system herein also includes an inert gas tank pressurizing system which maintains tank pressure above ambient pressure during descent of the aircraft to prevent crushing of the tank by increasing ambient pressure and also to prevent entrance of air into the vapor space thereby to maintain a low $O_2$ concentration in the vapor space insufficient to support combustion.

Other objects and advantages of the present invention will appear hereinafter.

DISCUSSION OF THE INVENTION

Figure 1:
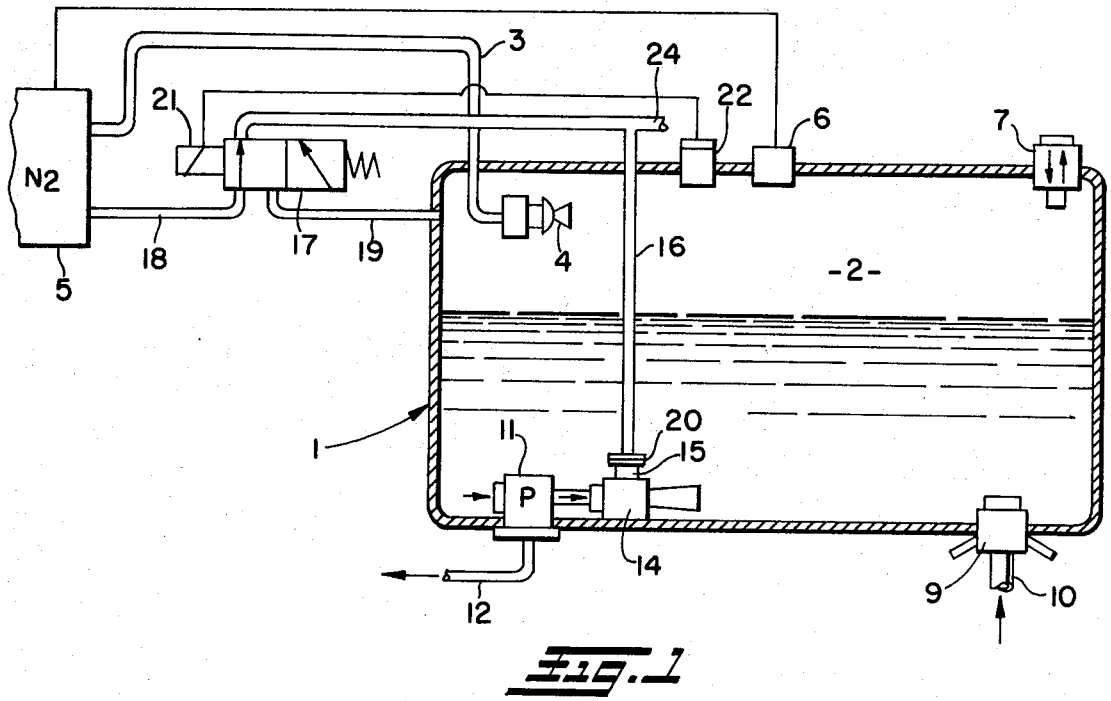
FIG. 1 is a diagrammatic view of a preferred embodiment of the present fuel inerting system.
Figure 2:
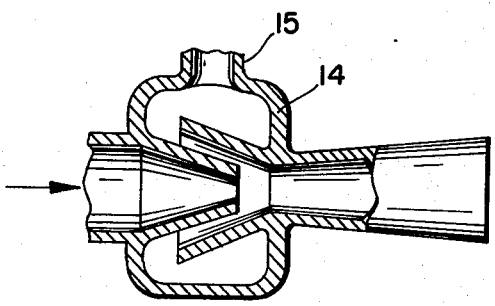
FIG. 2 is a cross section view of the mixing nozzle.

The reference numeral 1 in the drawing denotes an aircraft fuel tank such as a wing tank, for example, into the vapor space 2 of which is supplied an inert gas such as $N_2$ through the conduit 3 and fog nozzle 4 leading to a gas supply source 5 which may include a dewar, not shown, containing the inert gas in liquid form and containing suitable regulating valves to maintain predetermined pressure in the tank 1. The inert gas supply source 5 may be controlled by a differential pressure sensing device 6 for supply of inert gas through the fog nozzle 4 into the vapor space 2 when ambient pressure exceeds tank pressure by a predetermined amount, say, 0.1 psi as when the aircraft is descending.

The tank 1 is provided with a vent valve 7 for outflow of venting gases so that the inert gas present in the tank 1 maintains a maximum pressure differential between the vapor space 2 and the decreasing ambient pressure as when the aircraft is climbing. The vent valve 7 may have provision for inflow of air into the vapor space 2 as during descent of the aircraft in the event that the inert gas supply is exhausted or that the inert gas supply system 5 becomes inoperative thus to prevent crushing of the tank 1 during descent of the aircraft when ambient pressure increases.

The tank 1 has a fuel inlet valve 9 to which a fueling nozzle 10 is adapted to be coupled to refuel the tank. The inerting system is preferably so arranged that when the aircraft has landed after a flight in which the inerting system has been utilized to pressurize the tank 1 with inert gas, the pressure in the tank 1 may be between say 0.25 and 0.75 psi above ambient pressure. Should the aircraft be parked for an extended period of time the pressure differential may decrease to a lower value due to temperature changes or other reasons. When the pressure has decreased to a lower value such as 0.125 psi a regulator valve (not shown) in the supply source 5 will open so that inert gas will flow into the tank 1 via conduit 3 and nozzle 4 to bring the tank pressure up to 0.25 psi above ambient pressure, whereupon the valve aforesaid will then close. Such an arrangement is shown for example in U.S. patent application 711,020 filed Mar. 6, 1968, now U.S. Pat. No. 3,590,559 granted July 6, 1971

To effect scrubbing of the fuel in the tank 1 during the flight of the aircraft, especially during the climb phase, the fuel pumping system 11 not only supplies fuel from tank 1 to the feed line 12 leading to the aircraft engines but also circulates fuel in the tank 1 through a mixing nozzle 14 which has its suction port 15 selectively communicated with the $N_2$ supply source 5 or with the vapor space 2 via the conduit 16, solenoid operated control valve 17, and conduit 18 or conduit 19. A gas flow restrictor means 20 is also connected to the suction port 15.

When the solenoid 21 of valve 17 is energized as by control of a differential pressure sensing device 22 that senses a predetermined drop in tank pressure as compared with a reference pressure during climb of the aircraft in the manner described in the above mentioned patent application, valve 17 assumes the position shown in FIG. 1 and $N_2$ from source 5 flows through conduit 18, valve 17, conduit 16, gas flow restrictor means 20, and suction port 15 for intimate mixing with the fuel being pumped through the mixing nozzle 14 thereby scrubbing the fuel and liberating $O_2$ therefrom. The liberated $O_2$, mixed with $N_2$ rises through the fuel to ullage space where it may further mix with the $N_2$ therein, sufficient $N_2$ being within the ullage and/or introduced from supply 5 so that the $O_2$ content of the ullage is always maintained at less than 10 percent. When the solenoid 21 is de-energized, still under the control of pressure differential device 22, valve 17 shifts to close the supply conduit 18 and open communication between conduits 16 and 19 so that the suction port 15 is communicated with the vapor space 2. As the fuel continues to be pumped through the mixing nozzle 14 the resulting suction in the port 15 draws the gas mixture from vapor space 2 through line 19, valve 17, line 16 and restrictor 20 into mixing nozzle 14 where it mixes with fuel passing through the nozzle and is discharged into the body of fuel in the tank. This keeps fuel out of said port 15, said restrictor means 20, and conduit 16 that would otherwise enter the same from nozzle 14 when the connection of line 16 to the $N_2$ supply 5 is cut off. Thus, when the solenoid 21 is again energized, there is no delay in supplying of $N_2$ from 5 to nozzle 14 and hence in the commencement of the scrubbing of the fuel. Otherwise, if fuel had entered the conduit 16, the $N_2$ from supply 5 would first have to force the fuel through the gas flow restrictor means 20 and port 15 before scrubbing action would occur.

The system is adaptable for use with a plurality of fuel tanks, in which case line 16 has a branch 24 leading to another restrictor 20 and nozzle 14 in another tank (not shown), and the nozzle 14 in such other tank may be supplied with fuel by another pump 11 in such other tank, or by a branch connection with pump 11 in tank 1. In such case the restrictors 20 for the various nozzles 14 are selected with proper orifice sizes so as to balance the flow of $N_2$ or vapor therethrough in any desired manner.

I claim:

1. An inerting system for an aircraft fuel tank and the like comprising mixing means having an outlet in the tank and having a suction port; means for inducing flow of fuel through said mixing means; inert gas supply means; and control valve means operative to selectively communicate said suction port with said supply means to mix inert gas with the fuel as it flows through said mixing means thus to liberate $O_2$ from the fuel or with the vapor space of the tank to maintain said suction port free of fuel during continued operation of said inducing means.

2. The system of claim 1 wherein said tank has vent means for flow of venting gases from said vapor space.

3. The system of claim 1 wherein said mixing means has gas flow restrictor means at said suction port.

4. The system of claim 1 wherein said supply means has conduit means communicated with said vapor space independently of said control valve means to pressurize said tank with inert gas to maintain a pressure close to ambient pressure in said tank as during descent to the aircraft and to dilute the $O_2$ concentration in said vapor space.

5. The system of claim 1 wherein said suction port is disposed at a level below the fuel level in said tank; and wherein said control valve means has ports communicated with said supply means, said suction port, and said vapor space.

6. The system of claim 5 wherein said mixing means has gas flow restrictor means at said suction port also disposed below the fuel level in said tank.

7. In an aircraft fuel tank inerting system wherein an inert gas supply means is communicated with the vapor space of said tank to pressurize said tank and to prevent entry of air thereinto as during descent of the aircraft, the improvement which comprises mixing means having a fuel pressure inlet, an outlet which opens into said tank, and a suction port between said inlet and outlet; pump means for inducing flow of fuel through said mixing means; control valve means operative to selectively communicate said suction port with said supply means to mix inert gas with the fuel as it flows through said mixing means thus to liberate $O_2$ from the fuel or with said vapor space to maintain said suction port free of fuel during continued operation of said pump means; and vent means in said vapor space through which gases, including $O_2$ released from the fuel, are vented.

8. The system of claim 7 wherein said mixing means has gas flow restrictor means upstream of said suction port also disposed below the fuel level in said tank.

9. The system of claim 7 wherein said mixing means comprises a mixing nozzle.

10. An aircraft fuel tank inerting system comprising a fuel tank having a vent means; an inert gas supply means; first means for conducting inert gas from said supply means into the vapor space of said tank to pressurize said tank and to prevent entry of air into said tank through said vent means as during descent of the aircraft; second means for conducting inert gas into said tank as a fuel-inert gas mixture in which the inert gas is effective to liberate $O_2$ from the fuel into said vapor space for venting through said vent means; said second means comprising mixing means through which fuel in said tank is circulated and valve means operative to conduct inert gas to said mixing means either from said supply means or from said vapor space.

11. The system of claim 10 wherein said mixing means comprises a mixing nozzle having a suction port which is communicated with said supply means or with said vapor space by operation of said valve means.

12. The system of claim 10 wherein said mixing means has an outlet for fuel-inert gas mixture which is submerged in the fuel in said tank.

13. The system of claim 10 wherein pump means is operatively connected to said mixing means to circulate fuel in said tank through said mixing means.

14. The system of claim 11 wherein a gas flow restrictor means is disposed at the suction port of said mixing nozzle.

* * * * *